United States Patent [19]

Bernadic et al.

[11] Patent Number: 4,856,942
[45] Date of Patent: Aug. 15, 1989

[54] POLYGONAL CUTTING INSERT

[75] Inventors: Thomas Bernadic, Madison Heights; John Patterson, Hazel Park; Tony Lowe, Royal Oak, all of Mich.

[73] Assignee: GTE Valenite Corporaaag30tion, Troy, Mich.

[21] Appl. No.: 221,392

[22] Filed: Jul. 19, 1988

[51] Int. Cl.[4] ........................................ B23B 27/22
[52] U.S. Cl. ................................... 407/114; 407/116
[58] Field of Search ................ 407/113, 114, 115, 116

[56] References Cited

U.S. PATENT DOCUMENTS

| | | | |
|---|---|---|---|
| 3,395,434 | 8/1968 | Wirfeit | 407/114 |
| 3,399,442 | 9/1968 | Jones et al. | 29/95 |
| 3,786,540 | 1/1974 | Lundgren | 20/95 |
| 3,786,541 | 1/1974 | Lundgren | 29/95 |
| 3,800,379 | 4/1974 | Hopkins | 29/95 |
| 3,866,282 | 2/1975 | Lundgren | 29/95 |
| 3,885,281 | 5/1975 | Stambler | 29/95 |
| 3,947,937 | 4/1976 | Hertel | 407/116 |
| 4,056,871 | 11/1977 | Bator | 407/114 |
| 4,056,872 | 11/1977 | Seidel | 407/114 |
| 4,087,192 | 5/1978 | Hertel | 407/114 |
| 4,087,193 | 5/1978 | Mundy | 407/114 |
| 4,215,957 | 8/1980 | Holma et al. | 407/114 |
| 4,273,480 | 6/1981 | Shiral et al. | 407/114 |
| 4,318,644 | 3/1982 | Seidel | 407/114 |
| 4,334,808 | 6/1982 | Seidel | 407/114 |
| 4,335,984 | 6/1982 | Weekly | 407/114 |
| 4,344,725 | 8/1982 | Seidel | 407/114 |
| 4,367,990 | 1/1983 | Porat et al. | 407/114 |
| 4,465,412 | 8/1984 | Zweekly | 407/114 |
| 4,479,744 | 10/1984 | Stricker | 407/114 |
| 4,507,024 | 3/1985 | Stashko | 407/114 |
| 4,517,696 | 7/1986 | Maeda et al. | 407/114 |
| 4,561,809 | 12/1985 | Porat et al. | 407/114 |
| 4,597,696 | 7/1986 | Maeda et al. | 407/114 |
| 4,606,679 | 8/1986 | Jeremias | 407/114 |
| 4,626,140 | 12/1986 | Zweekly | 407/114 |
| 4,626,141 | 12/1986 | Malaker et al. | 407/114 |
| 4,685,844 | 8/1987 | McCreery et al. | 407/114 |
| 4,705,434 | 11/1987 | Patterson et al. | 407/114 |
| 4,710,069 | 12/1987 | Loquist . | |

FOREIGN PATENT DOCUMENTS 2306770 10/1976 France .

Primary Examiner—Frederick R. Schmidt
Assistant Examiner—William E. Terrell
Attorney, Agent, or Firm—Robert E. Walter

[57] ABSTRACT

A polygonal indexable cutting insert for cutting aluminum metal comprises rounded cutting corners with adjacent side surfaces joined at an angle of from about 33 to about 35 degress. Grooved recesses extending along each cutting edge have a particular geometry which includes a shallow descending surface followed by a steeply descending surface leading to the bottom of the grooved recess. An ascending surface directs the chip upwardly toward the top face and away from the insert and the cutting edge.

7 Claims, 1 Drawing Sheet

POLYGONAL CUTTING INSERT

BACKGROUND OF THE INVENTION

The present invention relates to disposable cutting inserts which may be detachably mounted on a tool holder for cutting a work piece. Cutting inserts of this type are generally made of cemented metal carbide and are formed by pressing and sintering techniques.

SUMMARY OF THE INVENTION

In the past, the cutting inserts for aluminum cutting used low sheer positive type geometries which created a problem with decreased tool life and marring the finish on the part being machined. When cutting a particular material, the direction of the chip flow would be such that the chips flow back into the workpiece resulting in marring.

In the present invention, as the workpiece is cut, the chip which is removed flows over the cutting edge and downwardly along a shallow descending surface portion followed by a steeper descending surface portion. The flowing chip next encounters the bottom of the chip breaker groove or channel. An ascending wall directs the chip upwardly and outwardly. In the present invention, the double shear geometry chip-form incorporates both a moderate shear positive land angle followed by a high positive incident angle. Thus, the chip breaker angle with the cutting edge results an efficient chip-breaking action so as to overcome the deficiencies of the prior art. More specifically, due to the configuration of the chip breaker, the chip tends to flow smoothly with better chip direction. Also the chipbreaker tends to follow the contour of the nose radius at both the entrance and the exit of the chip-form permitting the chip to flow through the nose area without the problem of material build up in this crucial area.

In accordance with the present invention, a polygonal indexable cutting insert for cutting aluminum metal comprises a pair of substantially parallel spaced apart faces and peripheral side surfaces. A top face forms a central island for the insert and the bottom face provides support for the insert when mounted to a cutting tool. The peripheral side surfaces form a clearance angle A of from about 82 to about 88 degrees with respect to the top face. A pair of rounded cutting corners which are formed at the juncture of a respective pair of adjacent side surfaces are located at opposite ends of the insert and adapted to be indexable when the insert is mounted on a cutting tool. The respective adjacent peripheral side surfaces forming the cutting corners are at an angle B of from about 33 to about 35 degrees.

A pair of cutting edges having straight portions extend away from each corner substantially within or slightly below the plane of the top face. To break the chips formed during cutting, grooved recesses extent along each cutting edge. Each of the grooved recesses includes a shallow descending surface followed by a steeply descending surface leading to the bottom of the chip breaker or grooved recess. An ascending surface which directs the chip upwardly toward the top face and away from the insert and the cutting edge. The grooved recesses extent rearwardly from the cutting edges a distance of from about 0.03 to about 0.07 inches and merge at the corners to form a chip breaker. Each of the grooved recesses terminate at the central island at a distance spaced from the remaining grooved recesses.

The ascending surface is at an angle of from about 16 to about 20 degrees with respect to the top face. The shallow descending surface is at an angle of from about 4 to about 6 degrees with respect to the top face and the steeply descending surface is at an angle of from about 17 to about 23 degrees with respect to the top face. Both descending surfaces are uniformly spaced from a respective rounded corner with the ascending surface forming a rounded contour at the juncture with the central island for providing enhanced chip flow.

It is an object of the present invention to obviate one or more disadvantages of the prior art.

Other and further objects of the present invention will be apparent to one of ordinary skill in the art from reading of the detailed specification.

DETAILED DESCRIPTION OF THE DRAWINGS

DETAILED DESCRIPTION OF THE PREFERRED EMBODIMENT

Figure 1:
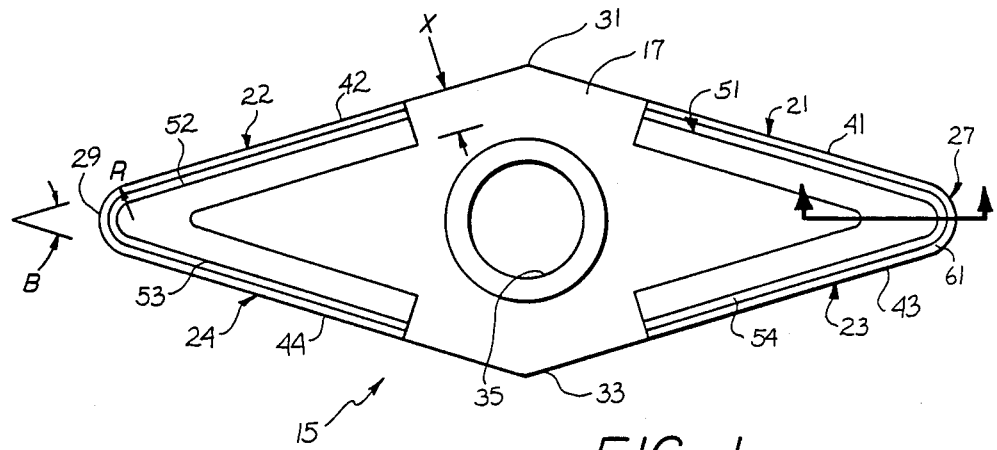
FIG. 1 is a top-elevational view of an insert of the present invention.

As shown in FIG. 1, the cutting insert 15 has a top face 17 and a bottom face 19 with peripheral side surfaces 21-24. The peripheral side surfaces 21-24 have a clearance angle of from about $\mu$ to about 88, preferably 85 degrees with respect to the top face. The purpose of the flat bottom face 19 is to provide support for the cutting insert 15 when it is mounted on a cutting tool. The peripheral side surfaces 21-24 form a pair of adjacent side surfaces 21,23 and 22,24 which merge at an angle of from about 32 to about 38 degrees, and preferably at an angle of about 35 degrees. A pair of cutting corners 27,29 are formed at the merger of the respective adjacent side surfaces 21,23 and 22,24. The respective pair of opposite side surfaces 22,23 and 21,24 are substantially parallel. The top face 17 and the bottom face 19 join with peripheral side surfaces 21-24 to form a pair of opposite non-cutting corners 31,33 at the junctions. The angle of the respective non-cutting corners 31,33 is the supplement of the respective angle formed by the adjacent sides 21,23 and 22,24 at the cutting corners 27,29.

For mounting purposes, the insert 15 is desirably provided with an opening 35 extending entirely through the insert 15 from the top face 17 to the bottom face 19. In the region adjacent the bottom face 19, the opening 35 has straight sides extending inwardly in a diection normal to the bottom face 19. In the region adjacent the top face 17, the opening bevels outwardly for accommodating the head of a threaded screw which can be used to provide secure attachment of the insert 15 to a tool.

For purposes of the following discussion, inwardly or the inward direction is toward the center of the insert while outwardly or the outward direction is in a direction away from the center of the insert. With reference to chip flow over a cutting edge, the radial direction is generally perpendicular to the cutting edge while the axial direction is parallel to the cutting edge.

Figure 2:
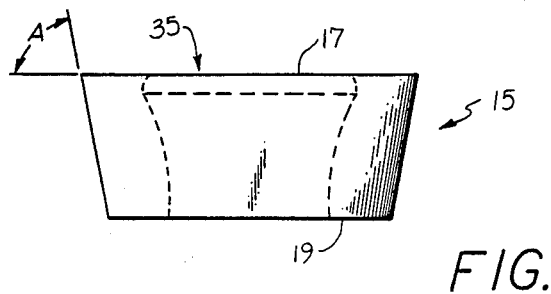
FIG. 2 is a sectional view along section 2—2 of FIG. 1.
Figure 3:
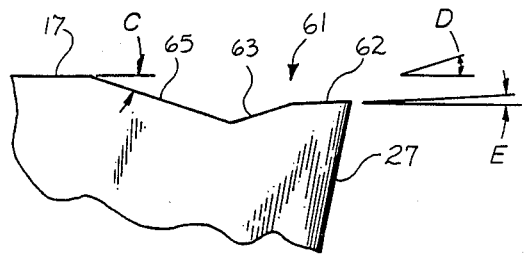
FIG. 3 is a detailed sectional view of a chip breaker along a portion of line 2—2 of FIG. 1.

Continuing with a discussion of FIGS. 1 and 2, the respective merging adjacent peripheral side surfaces 21,23 and 22,24 form respective pairs of straight cutting edges 41,43 and 42,44 which substantially lie in the same plane which plane either corresponds to the top face 17 or lies just below the top face 17. The respective merging adjacent peripheral side surfaces 21,23 and 22,24 join to form a respective pair of rounded cutting corners 27,29 which have a radius R of from about 0.3 to about 0.6 inches and preferably from about 0.4 to about 0.5 inches. In the preferred embodiment, as illustrated in the drawings, the respective pair of cutting edges 41,43 and 42,44 which extend away from respective corners 27,29 are preferably positioned in a plane below the plane of said top face 17. Each of the cutting edges 41-44 has associated therewith one of the similarly formed grooved recesses 51-54.

As illustrated in FIG. 1, the grooved recesses 51-54 extent rearwardly from the cutting edges a distance X of from about 0.03 to about 0.07 inches, and preferably a distance of about 0.04 to about 0.06. Each of the grooved recesses 51-54, which merge at the corners 31,33 to from a chip breaker, terminate at a central island at a distance spaced from the remaining grooved recesses 51-54. The central island is formed as a portion of the top face 17. Since the grooved recesses 51-54 are similar, a description of grooved recess 51 and the cutting corner 27 serves as a description of the remaining grooved recesses 52-54 and their associated cutting corners 27,29. Grooved recess 51 comprises a descending surface 61 of uniform width extending downwardly from a cutting edge 41 and an ascending surface 65 extending upwardly from the descending surface 61 to the central island. The ascending surface 65 is at an angle C of from about 16 to about 20 degrees with respect to the top face 17 and preferably at an angle of 18 degrees.

The descending surface 61 comprises a shallow or first surface 62 of uniform width directly adjoining the cutting edge 41 and a steep or second surface 63 of uniform width joining the first surface 62 to the ascending surface 65. The first surface 62 is at an angle D of from about 4 to about 6 degrees, and preferably 5 degrees, with respect to the top face 15. The second surface 63 is at an angle E of from about 17 to about 23 degrees with respect to the top face 15, and preferably at an angle of 20 degrees. The first surface 62 extends inwardly a predetermined distance from a cutting edge 41 and forms a land of uniform width extending adjacent the periphery of the insert 15 along the entire cutting edge 41 so as to strengthen the cutting edge 41. Note that as illustrated in the drawings, the first surface 62 would normally intersect a respective peripheral surface at a juncture with the top face 15. Due to the presence of the second surface 63, the cutting edge 41 is positioned below the plane of the top face 15 a distance which corresponds to the angle of the second surface 63. As previously discussed, since the slope of the second surface is shallow, the cutting edge is typically depressed only a slight distance from the plane of the top surface. Typically the distance is on the order of from about 0.001 to about 0.005 inch.

The respective first and second surfaces 62 and 63 which are uniformly spaced from a respective rounded corner 27, together with the ascending surface 65, form a rounded contour at the juncture with the central island for providing enhanced chip flow. In operation, the chip breaker of the present invention tends to influence the flow of the chip by permitting the chip to flow through the nose area without the problem of material build up.

We claim:

1. A polygonal indexable cutting insert comprising a top face forming a central island and a bottom face, said faces being substantially parallel, four peripheral straight side surfaces having a clearance angle of from about 82 to about 88 degrees with respect to said top face, said peripheral side surfaces forming a pair of adjacent side surfaces and a pair of opposite side surfaces, said opposite side surfaces being substantially parallel and said adjacent side surfaces merging at an angle of from about 32 to about 38 degrees, a pair of rounded cutting corners having a radius of from about 0.3 to about 0.6 inches and being formed at the juncture of said adjacent side surfaces, a pair of cutting edges being substantially positioned in or immediately below the plane of said top face and having straight portions extending away from each corner and, grooved recesses extending rearwardly from said cutting edges a distance of from about 0.04 to about 0.06 inches and merging at said corners to from a chip breaker, each of said grooves recesses terminating at said central island at a distance spaced from said remaining grooved recesses each of said grooved recesses comprising a descending surface of uniform width extending downwardly from a respective cutting edge, and an ascending surface extending upwardly from said descending surface to said central island, said ascending surface is at an angle of from about 16 to about 20 degrees with respect to said top face, said descending surface comprises a first surface of uniform width directly adjoining said cutting edge and a second surface of uniform width joining said first surface to said ascending surface, said first surface is at an angle of from about 4 to about 6 degrees with respect to said top face and said second surface is at an angle of from about 17 to about 23 degrees with respect to said top face, said respective first and second surfaces being uniformly spaced from and extending entirely around a respective rounded corner and said ascending surface forming a rounded contour at the juncture with said central island for providing enhanced chip flow.

2. A polygonal indexable cutting insert according to claim 1 wherein said clearance angle is about 85 degrees.

3. A polygonal indexable cutting insert according to claim 1 wherein said cutting edges lie below the plane of said top face.

4. A polygonal indexable cutting insert according to claim 3 wherein said insert comprises a centrally located opening extending entirely through said insert from said top face to said bottom face.

5. A polygonal indexable cutting insert according to claim 4 wherein said opening bevels outwardly at the junction with the top face.

6. A polygonal indexable cutting insert according to claim 5 wherein each rounded cutting corner has a radius of from about 0.4 to about 0.5 inch.

7. A polygonal indexable cutting insert according to claim 6 wherein said ascending surface is at an angle of 18 degrees.

* * * * *